(12) United States Patent
Matsuura

(10) Patent No.: US 10,734,886 B2
(45) Date of Patent: Aug. 4, 2020

(54) SWITCHING POWER SUPPLY DEVICE

(71) Applicant: TDK CORPORATION, Tokyo (JP)

(72) Inventor: Ken Matsuura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 16/574,276

(22) Filed: Sep. 18, 2019

(65) Prior Publication Data

US 2020/0106354 A1 Apr. 2, 2020

(30) Foreign Application Priority Data

Sep. 27, 2018 (JP) .................................. 2018-182096

(51) Int. Cl.
*H02M 1/00* (2006.01)
*H02M 1/42* (2007.01)
*H02M 7/217* (2006.01)

(52) U.S. Cl.
CPC ....... *H02M 1/4208* (2013.01); *H02M 7/2176* (2013.01)

(58) Field of Classification Search
CPC .... H02M 1/4208; H02M 7/2176; H02M 7/12; H02M 2003/1566; G05F 1/00
See application file for complete search history.

(56) References Cited

U.S. PATENT DOCUMENTS

2012/0069615 A1* 3/2012 Tomioka ............. H02M 1/4208
363/126

FOREIGN PATENT DOCUMENTS

JP    2001-218467 A    8/2001
JP    2012-070490 A    4/2012

* cited by examiner

*Primary Examiner* — Adolf D Berhane
*Assistant Examiner* — Afework S Demisse
(74) *Attorney, Agent, or Firm* — Oliff PLC

(57) ABSTRACT

The switching power supply device includes an AC voltage input unit, a filter, a first inductor, a switching unit, a first rectification unit that includes first and second rectifier elements, in which the first and second rectifier elements are connected in series, in which a second output terminal of the AV voltage input unit is electrically connected to a transmission line, which connects the first and second rectifier elements, via the filter, and that is connected in parallel to the switching unit, a first capacitor, an inverter, a second rectification unit that includes an input terminal which is connected to a secondary coil, a smoothing unit that is connected between the output terminals of the second rectification unit, a control unit, a second capacitor that is connected between a transmission line, which connects the first and second rectifier element, and the smoothing unit, and a twentieth capacitor.

18 Claims, 5 Drawing Sheets

SWITCHING POWER SUPPLY DEVICE

BACKGROUND OF THE INVENTION

Field of the Invention

The present invention relates to a switching power supply device.

Description of Related Art

Research and development of power supply devices have been carried out.

In this regard, a power supply device including a power factor correction circuit is known (see Japanese Unexamined Patent Application, First Publication No. 2012-070490 and Japanese Unexamined Patent Application, Second Publication No. 2001-218467). Particularly, Japanese Unexamined Patent Application, First Publication No. 2012-070490 discloses a power supply device including a totem pole type bridgeless power factor correction converter.

SUMMARY OF THE INVENTION

In a switching power supply device in which a totem pole type bridgeless power factor correction converter and an insulation type direct current (DC)-DC converter are combined, conduction noise may be caused on the basis of a noise current which is generated between a primary coil of a transformer of the DC-DC converter and a secondary coil of the transformer may be.

The invention is made in consideration of the above-mentioned circumstances and an objective thereof is to provide a switching power supply device that can curb generation of conduction noise based on a noise current which is generated between a primary coil and a secondary coil of a transformer.

According to an aspect of the invention, there is provided a switching power supply device that is connected to a load and supplies a direct current (DC) voltage to the load, the switching power supply device including: an alternating current (AC) voltage input unit that is supplied with an AC voltage; a filter that is connected to the AC voltage input unit and a frame ground and reduces noise of the AC voltage supplied from the AC voltage input unit; a first inductor that is electrically connected to a first output terminal of the AC voltage input unit via the filter; a switching unit that includes a first switching element and a second switching element, in which the first switching element and the second switching element are connected in series to each other, and of which a terminal which is not electrically connected to the first output terminal of the AC voltage input unit out of two terminals of the first inductor is connected to a transmission line connecting the first switching element and the second switching element; a first rectification unit that includes a first rectifier element and a second rectifier element, in which the first rectifier element and the second rectifier element are connected in series, in which a second output terminal of the AC voltage input unit is electrically connected to a transmission line connecting the first rectifier element and the second rectifier element via the filter, and which is connected in parallel to the switching unit; a first capacitor that is connected in parallel to the first rectification unit; an inverter that includes a transformer including a primary coil and a secondary coil and in which the first capacitor is connected between input terminals thereof; a second rectification unit that includes an input terminal which is connected to the secondary coil; a smoothing unit that is connected between the first and second output terminals of the second rectification unit; a control unit that performs switching control of the first switching element, the second switching element, and a switching element of the inverter; a second capacitor that is connected between a transmission line connecting the first rectifier element and the second rectifier element and the smoothing unit; and a twentieth capacitor that is connected between the smoothing unit and the frame ground.

According to the invention, it is possible to curb generation of conduction noise based on a noise current which is generated between a primary coil and a secondary coil of a transformer.

DETAILED DESCRIPTION OF THE INVENTION

Embodiment

Figure 1:
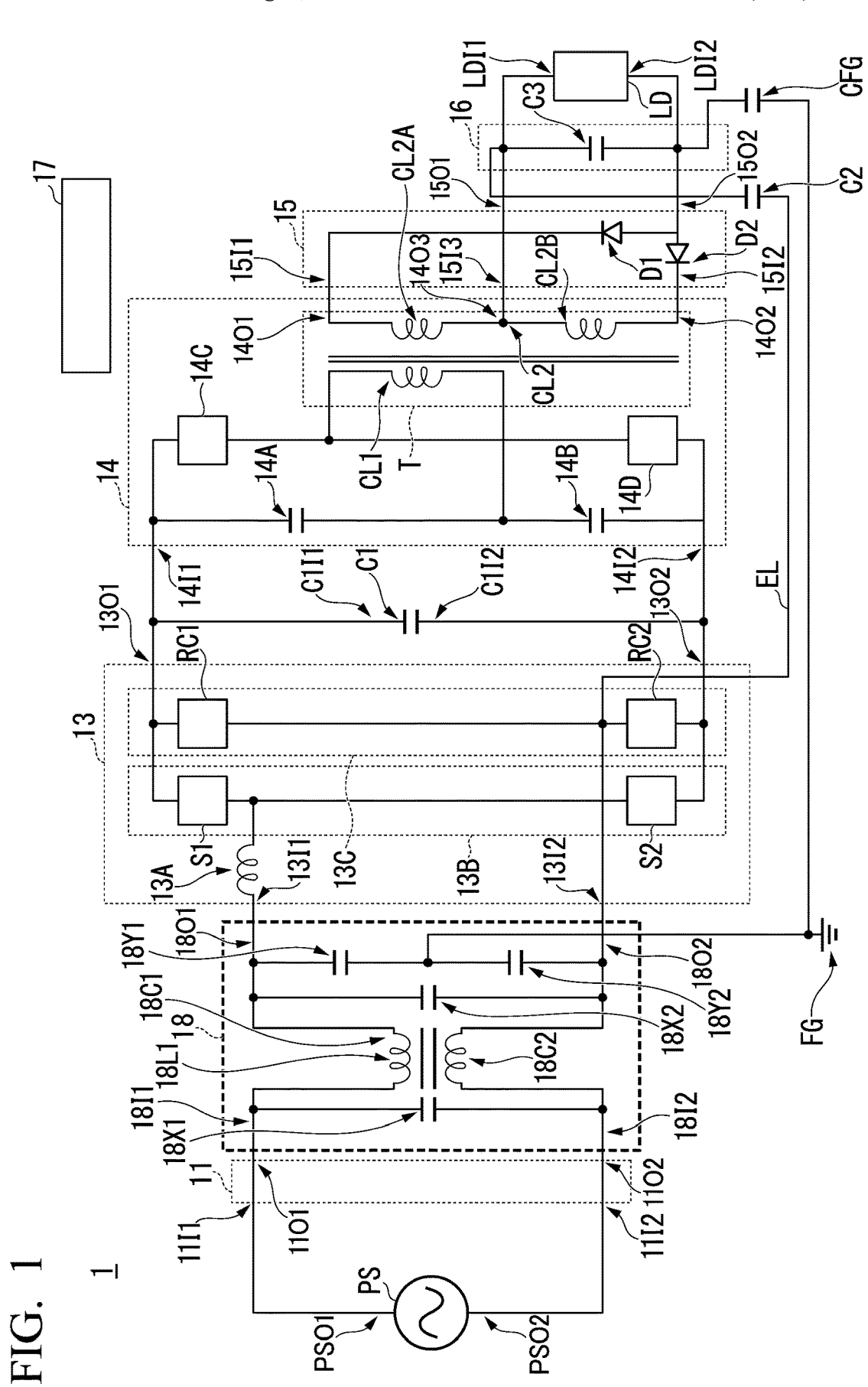
FIG. 1 is a diagram illustrating an example of a configuration of a switching power supply device 1 according to an embodiment.

Hereinafter, an embodiment of the present invention will be described with reference to the accompanying drawings. In this embodiment, a conductor that transmits an electrical signal based on DC power or an electrical signal based on AC power is referred to as a transmission line. A transmission line may be a conductor which is printed on a board, a wire which is formed of a conductor in a line shape, or another conductor.

<Outline of Switching Power Supply Device>

First, the outline of a switching power supply device according to an embodiment will be described below. A switching power supply device according to the embodiment is connected to a load and supplies a direct current (DC) voltage to the load. The switching power supply device according to the embodiment includes an alternating current (AC) voltage input unit, a filter, a first inductor, a switching unit, a first rectification unit, a first capacitor, an inverter, a second rectification unit, a smoothing unit, a control unit, a second capacitor, and a twentieth capacitor.

The AC voltage input unit is supplied with an AC voltage. The filter is connected to the AC voltage input unit and a frame ground and reduces noise of the AC voltage which is supplied from the AC voltage input unit.

The first inductor is electrically connected to a first output terminal of the AC voltage input unit via a filter. The switching unit includes a first switching element and a second switching element. In the switching unit, the first switching element and the second switching element are connected in series to each other. In the switching unit, a terminal which is not electrically connected to the first output terminal out of two terminals of the first inductor is connected to a transmission line which connects the first switching element and the second switching element.

The first rectification unit includes a first rectifier element and a second rectifier element. In the first rectification unit, the first rectifier element and the second rectifier element are connected in series. In the first rectification unit, a second output terminal of the AC voltage input unit is electrically connected to a transmission line connecting the first rectifier element and the second rectifier element via the filter. The first rectification unit is connected in parallel to the switching unit. The first capacitor is connected in parallel to the first rectification unit.

The inverter includes a transformer including a primary coil and a secondary coil, and the first capacitor is connected between input terminals thereof. The second rectification unit includes an input terminal which is connected to the secondary coil. The smoothing unit is connected between the first and second output terminals of the second rectification unit. The control unit performs switching control of the first switching element, the second switching element, and a switching element of the inverter.

The second capacitor is connected between a transmission line, which connects the first rectifier element and the second rectifier element, and the smoothing unit. The twentieth capacitor is connected between the smoothing unit and the frame ground.

Accordingly, the switching power supply device according to the embodiment can curb generation of conduction noise based on a noise current which is generated between a primary coil and a secondary coil of a transformer. In the following description, a circuit configuration of the switching power supply device will be described in detail.

<Circuit Configuration of Switching Power Supply Device>

Hereinafter, a circuit configuration of the switching power supply device 1 according to the embodiment will be described with reference to FIG. 1. FIG. 1 is a diagram illustrating an example of a configuration of the switching power supply device 1 according to the embodiment.

The switching power supply device 1 is an example of the above-mentioned switching power supply device. In the example illustrated in FIG. 1, the switching power supply device 1 is connected to an AC power source PS. The switching power supply device 1 is also connected to a load LD. The switching power supply device 1 converts an AC voltage supplied from the AC power source PS into a DC voltage. Then, the switching power supply device 1 supplies the converted DC voltage to the load LD.

Here, the AC power source PS is a power source that supplies an AC voltage. The AC power source PS may be any power source as long as it can supply an AC voltage. The AC power source PS includes two terminals including a first terminal PSO1 and a second terminal PSO2.

The load LD is, for example, a circuit or a device that is driven on the basis of a DC voltage which is supplied from the switching power supply device 1. The load LD includes two terminals including a first terminal LDI1 and a second terminal LDI2.

The switching power supply device 1 includes an AC voltage input unit 11, a filter 18, a power factor correction circuit 13, an inverter 14, a second rectification unit 15, a smoothing unit 16, a control unit 17, a first capacitor C1, a second capacitor C2, and a twentieth capacitor CFG. The switching power supply device 1 is used in a state in which it is connected to the AC power source PS and the load LD. The switching power supply device 1 may further include some or all of other circuit elements, other devices, and the like.

The AC voltage input unit 11 is supplied with an AC voltage from the AC power source PS. The AC voltage input unit 11 inputs the AC voltage supplied from the AC power source PS to a circuit in a stage following the AC voltage input unit 11. In the example illustrated in FIG. 1, the AC voltage input unit 11 inputs the AC voltage to the filter 18.

The AC voltage input unit 11 includes two input terminals including a first input terminal 11I1 and a second input terminal 11I2. The AC voltage input unit 11 includes two output terminals including a first output terminal 11O1 and a second output terminal 11O2. The AC voltage input unit 11 may have a configuration including a frame ground (FG) terminal. Here, an FG terminal may be a terminal which is connected to a frame ground FG illustrated in FIG. 1. In the example illustrated in FIG. 1, the frame ground FG is a casing of the switching power supply device 1. The frame ground FG may be another casing other than the casing of the switching power supply device 1. The frame ground FG is not limited to a casing and may be an FG pattern that is provided in the switching power supply device 1.

The first input terminal 11I1 is connected to a first terminal PSO1 of the AC power source PS via a transmission line. Accordingly, the first input terminal 11I1 is supplied with an AC voltage from the first terminal PSO1. A configuration in which another circuit element or the like is connected between the first input terminal 11I1 and the first terminal PSO1 may be employed.

The second input terminal 11I2 is connected to a second terminal PSO2 of the AC power source PS via a transmission line. Accordingly, the second input terminal 11I2 is supplied with an AC voltage from the second terminal PSO2. A configuration in which another circuit element or the like is connected between the second input terminal 11I2 and the second terminal PSO2 may be employed.

The AC voltage input unit 11 outputs the AC voltage, which is supplied to the first input terminal 11I1, from the first output terminal 11O1.

The AC voltage input unit 11 outputs the AC voltage, which is supplied to the second input terminal 11I2, from the second output terminal 11O2.

The filter 18 is a noise filter. The filter 18 is connected to the AC voltage input unit 11 and the frame ground FG. The filter 18 is supplied with an AC voltage from the AC voltage input unit 11. The filter 18 reduces conduction noise which is generated in the switching power supply device 1 such that the conduction noise is not transmitted to the AC power source PS. The filter 18 reduces external conduction noise transmitted from the AC power source PS side such that the external conduction noise is not transmitted in the switching power supply device 1.

More specifically, in the example illustrated in FIG. 1, the filter 18 includes two input terminals including a first input terminal 18I1 and a second input terminal 18I2. The filter 18 includes two output terminals including a first output terminal 18O1 and a second output terminal 18O2.

In the example illustrated in FIG. 1, the filter 18 includes a common-mode choke coil 18L1, a capacitor 18X1, a tenth capacitor 18X2, an eleventh capacitor 18Y1, and a twelfth capacitor 18Y2. The filter 18 may include another circuit element in addition to the circuit elements. The filter 18 may not include the capacitor 18X1. The filter 18 may be a noise filter having another configuration instead of the noise filter having the configuration illustrated in FIG. 1.

Here, the first input terminal 18I1 is connected to the first output terminal 11O1 of the AC voltage input unit 11 via a transmission line. The second input terminal 18I2 is connected to the second output terminal 11O2 of the AC voltage input unit 11 via a transmission line. The capacitor 18X1 is connected between the first input terminal 18I1 and the second input terminal 18I2 via a transmission line. The switching power supply device 1 may employ a configuration in which another circuit element or the like is provided in a transmission line connecting the first output terminal 11O1 and the first input terminal 18I1. The switching power supply device 1 may employ a configuration in which another circuit element or the like is provided in a transmission line connecting the second output terminal 11O2 and the second input terminal 18I2.

The common-mode choke coil 18L1 includes at least two coils. In the example illustrated in FIG. 1, the common-mode choke coil 18L1 includes a coil 18C1 and a coil 18C2 as the two coils. A terminal which is connected to the first input terminal 18I1 out of terminals of the capacitor 18X1 is connected to the coil 18C1 via a transmission line. A terminal which is connected to the second input terminal 18I2 out of the terminals of the capacitor 18X1 is connected to the coil 18C2 via a transmission line. That is, the common-mode choke coil 18L1 is electrically connected between the first output terminal 11O1 of the AC voltage input unit 11 and the second output terminal 11O2 of the AC voltage input unit 11.

The tenth capacitor 18X2 is connected between a terminal which is not connected to the capacitor 18X1 out of terminals of the coil 18C1 and a terminal which is not connected to the capacitor 18X1 out of terminals of the coil 18C2 via a transmission line. That is, the tenth capacitor 18X2 is connected between output terminals of the common-mode choke coil 18L1. A node between the output terminals refers to a node between the terminal which is not connected to the capacitor 18X1 out of the terminals of the coil 18C1 and the terminal which is not connected to the capacitor 18X1 out of the terminals of the coil 18C2.

A terminal which is connected to the coil 18C1 out of terminals of the tenth capacitor 18X2 is connected to the first output terminal 18O1 via a transmission line. The eleventh capacitor 18Y1 is connected between a node in a transmission line connecting the terminal which is connected to the coil 18C1 out of the terminals of the tenth capacitor 18X2 to the first output terminal 18O1 and the frame ground FG. The terminal which is connected to the coil 18C2 out of the terminals of the tenth capacitor 18X2 is connected to the second output terminal 18O2 via a transmission line. The twelfth capacitor 18Y2 is connected between a node in a transmission line connecting the terminal which is connected to the coil 18C2 out of the terminals of the tenth capacitor 18X2 to the second output terminal 18O2 and the frame ground FG. In the example illustrated in FIG. 1, the terminal which is not connected to the coil 18C1 out of the terminals of the eleventh capacitor 18Y1 and the terminal not connected to the coil 18C2 out of the terminals of the twelfth capacitor 18Y2 are connected to each other via a transmission line, and the transmission line and the frame ground FG are connected to each other. However, the terminal which is not connected to the coil 18C1 out of the terminals of the eleventh capacitor 18Y1 and the terminal which is not connected to the coil 18C2 out of the terminals of the twelfth capacitor 18Y2 may not be connected to each other via a transmission line but may be independently connected to the common frame ground FG.

The power factor correction circuit 13 is a totem pole type bridgeless power factor correction converter. The power factor correction circuit 13 includes, for example, a first inductor 13A, a switching unit 13B, and a first rectification unit 13C. The circuit configuration of the power factor correction circuit 13 may have another circuit configuration serving as a totem pole type bridgeless power factor correction converter instead of the circuit configuration illustrated in FIG. 1.

The power factor correction circuit 13 includes two input terminals including a first input terminal 13I1 and a second input terminal 13I2. The power factor correction circuit 13 includes two output terminals including a first output terminal 13O1 and a second output terminal 13O2. The switching unit 13B includes a first switching element S1 and a second switching element S2. The first rectification unit 13C includes a first rectifier element RC1 and a second rectifier element RC2.

The first input terminal 13I1 is connected to the first output terminal 18O1 of the filter 18 via a transmission line. Accordingly, the first input terminal 13I1 is supplied with an AC voltage from the first output terminal 18O1. The switching power supply device 1 may employ a configuration in which another circuit element or the like is provided in a transmission line connecting the first output terminal 18O1 and the first input terminal 13I1.

The second input terminal 13I2 is connected to the second output terminal 18O2 of the filter 18 via a transmission line. Accordingly, the second input terminal 13I2 is supplied with an AC voltage from the second output terminal 18O2. The switching power supply device 1 may employ a configuration in which another circuit element or the like is provided in a transmission line connecting the second output terminal 18O2 and the second input terminal 13I2.

One terminal of the first inductor 13A is connected to the first input terminal 13I1 via a transmission line. The other terminal of the first inductor 13A is connected to the switching unit 13B via a transmission line. In the switching unit 13B, the first switching element S1 and the second switching element S2 are connected in series. The other terminal of the first inductor 13A is connected to a transmission line connecting the first switching element S1 and the second switching element S2 in the switching unit 13B via a transmission line.

The first switching element S1 is, for example, a field effect transistor using gallium nitride as a semiconductor. In FIG. 1, for the purpose of simplification of the drawing, the first switching element S1 is illustrated as a rectangle. The first switching element S1 may be a field effect transistor using another material as a semiconductor. The first switching element S1 may be another switching element such as a bipolar transistor instead of a field effect transistor.

The second switching element S2 is, for example, a field effect transistor using gallium nitride as a semiconductor. In FIG. 1, for the purpose of simplification of the drawing, the second switching element S2 is illustrated as a rectangle. The second switching element S2 may be a field effect transistor using another material as a semiconductor. The second switching element S2 may be another switching element such as a bipolar transistor instead of a field effect transistor.

The source terminal of the first switching element S1 is connected to the drain terminal of the second switching element S2 via a transmission line. The first rectification unit 13C of the power factor correction circuit 13 is connected between the drain terminal of the first switching element S1 and the source terminal of the second switching element S2.

In the power factor correction circuit 13, the first rectifier element RC1 and the second rectifier element RC2 are connected in series via a transmission line.

The first rectifier element RC1 is, for example, a field effect transistor using silicon as a semiconductor. In FIG. 1, for the purpose of simplification of the drawing, the first rectifier element RC1 is illustrated as a rectangle. The first rectifier element RC1 may be a field effect transistor using another material as a semiconductor. The first rectifier element RC1 may be another switching element such as a bipolar transistor or another rectifier element such as a diode instead of a field effect transistor.

The second rectifier element RC2 is, for example, a field effect transistor using silicon as a semiconductor. In FIG. 1, for the purpose of simplification of the drawing, the second rectifier element RC2 is illustrated as a rectangle. The second rectifier element RC2 may be a field effect transistor using another material as a semiconductor. The second rectifier element RC2 may be another switching element such as a bipolar transistor or another rectifier element such as a diode instead of a field effect transistor.

The source terminal of the first rectifier element RC1 is connected to the drain terminal of the second rectifier element RC2 via a transmission line. The drain terminal of the first rectifier element RC1 is connected to the drain terminal of the first switching element S1 via a transmission line. The first output terminal 13O1 is connected to a transmission line connecting the drain terminal of the first rectifier element RC1 and the drain terminal of the first switching element S1 via a transmission line. The source terminal of the second rectifier element RC2 is connected to the source terminal of the second switching element S2 via a transmission line. The second output terminal 13O2 is connected to a transmission line connecting the source terminal of the second rectifier element RC2 and the source terminal of the second switching element S2 via a transmission line.

The first capacitor C1 is, for example, an electrolytic capacitor. The first capacitor C1 may be another type of capacitor instead of an electrolytic capacitor.

The first capacitor C1 includes two terminals including a first terminal C1I1 and a second terminal C1I2. The first terminal C1I1 is connected to the first output terminal 13O1 of the first rectification unit 13C. The second terminal C1I2 is connected to the second output terminal 13O2 of the first rectification unit 13C via a transmission line. That is, the first capacitor C1 is connected between the first output terminal 13O1 and the second output terminal 13O2.

In this way, in the switching power supply device 1, the switching unit 13B and the first rectification unit 13C are connected in parallel. In the switching power supply device 1, the first rectification unit 13C and the first capacitor C1 are connected in parallel.

The inverter 14 is an inverter including circuits of a primary-side half bridge and a secondary-side center tap which are insulated. The inverter 14 includes two input terminals including a first input terminal 14I1 and a second input terminal 14I2. The inverter 14 includes three output terminals including a first output terminal 14O1, a second output terminal 14O2, and a third output terminal 14O3. The inverter 14 includes a capacitor 14A, a capacitor 14B, a switching element 14C, a switching element 14D, and a transformer T. The transformer T includes a first coil CL1 and a second coil CL2. The inverter 14 may employ another circuit configuration serving as an inverter instead of the circuit configuration illustrated in FIG. 1. That is, the inverter 14 may be an inverter other than a half bridge converter.

The first input terminal 14I1 is connected to a transmission line connecting the first output terminal 13O1 of the first rectification unit 13C and the first terminal C1I1 of the first capacitor C1 via a transmission line. The second input terminal 14I2 is connected to a transmission line connecting the second output terminal 13O2 of the first rectification unit 13C and the second terminal C1I2 of the first capacitor C1 via a transmission line. That is, the first capacitor C1 is connected between the input terminals of the inverter 14. A node between the input terminals is a node between the first input terminal 14I1 and the second input terminal 14I2.

In the inverter 14, the capacitor 14A and the capacitor 14B are connected in series via a transmission line between the first input terminal 14I1 and the second input terminal 14I2. In the example illustrated in FIG. 1, the capacitor 14A and the capacitor 14B are connected in series in the order of the capacitor 14A and the capacitor 14B from the first input terminal 14I1 to the second input terminal 14I2.

The capacitor 14A is, for example, a ceramic capacitor. The capacitor 14A may be another type of capacitor instead of a ceramic capacitor.

The capacitor 14B is, for example, a ceramic capacitor. The capacitor 14B may be another type of capacitor instead of a ceramic capacitor.

The switching element 14C is, for example, a field effect transistor. The switching element 14C may be another switching element such as a bipolar transistor instead of a field effect transistor.

The switching element 14D is, for example, a field effect transistor. The switching element 14D may be another switching element such as a bipolar transistor instead of a field effect transistor.

The drain terminal of the switching element 14C is connected to a transmission line connecting the first input terminal 14I1 and the capacitor 14A via a transmission line. The source terminal of the switching element 14C is connected to the drain terminal of the switching element 14D via a transmission line. The source terminal of the switching element 14D is connected to a transmission line connecting the second input terminal 14I2 and the capacitor 14B via a transmission line.

The first coil CL1 is a primary coil of the transformer T. One terminal of the first coil CL1 is connected to a transmission line connecting the source terminal of the switching element 14C and the drain terminal of the switching element 14D via a transmission line. The other terminal of the first coil CL1 is connected to a transmission line connecting a terminal which is not connected to the first input terminal 14I1 out of the terminals of the capacitor 14A and a terminal which is not connected to the second input terminal 14I2 out of the terminals of the capacitor 14B via a transmission line.

In the example illustrated in FIG. 1, the first capacitor C1 is electrically connected to both ends of the first coil CL1 by the configuration of the inverter 14 illustrated in FIG. 1. More specifically, in the inverter 14, when the switching element 14C is in an ON state and the switching element 14D is in an OFF state, the first capacitor C1 is electrically connected to both ends of the first coil CL1 via the switching element 14C and the capacitor 14B. In the inverter 14, when the switching element 14C is in the OFF state and the switching element 14D is in the ON state, the first capacitor C1 is electrically connected to both ends of the first coil CL1 via the switching element 14D and the capacitor 14A. Here, the ON state refers to a state in which the drain terminal and the source terminal of a field effect transistor are electrically connected to each other. The OFF state refers to a state in which the drain terminal and the source terminal of a field effect transistor are not electrically connected to each other.

The second coil CL2 is a secondary coil of the transformer T. In the example illustrated in FIG. 1, the second coil CL2 includes two coils including a 2A-th coil CL2A and a 2B-th coil CL2B. More specifically, in the second coil CL2, the 2A-th coil CL2A and the 2B-th coil CL2B are connected in series.

A terminal which is not connected to the 2B-th coil CL2B out of two terminals of the 2A-th coil CL2A is connected to the first output terminal 14O1 via a transmission line. A terminal which is not connected to the 2A-th coil CL2A out of two terminals of the 2B-th coil CL2B is connected to the second output terminal 14O2 via a transmission line. The third output terminal 14O3 is connected to a transmission line connecting the 2A-th coil CL2A and the 2B-th coil CL2B via a transmission line.

The second rectification unit 15 includes three input terminals including a first input terminal 15I1 and a second input terminal 15I2, and a third input terminal 15I3. The second rectification unit 15 includes two output terminals including a first output terminal 15O1 and a second output terminal 15O2. The second rectification unit 15 includes two diodes including a diode D1 and a diode D2.

The first input terminal 15I1 is connected to the first output terminal 14O1 of the inverter 14 via a transmission line. The second input terminal 15I2 is connected to the second output terminal 14O2 of the inverter 14 via a transmission line. The third input terminal 15I3 is connected to the third output terminal 14O3 of the inverter 14 via a transmission line. That is, the second rectification unit 15 includes input terminals connected to the second coil CL2.

In the second rectification unit 15, the first input terminal 15I1 is connected to the cathode of the diode D1 via a transmission line. The second input terminal 15I2 is connected to the cathode of the diode D2 via a transmission line. In the second rectification unit 15, the third input terminal 15I3 is connected to the first output terminal 15O1 via a transmission line. The anode of the diode D1 is connected to the anode of the diode D2 via a transmission line. That is, in the second rectification unit 15, the diode D1 and the diode D2 are connected in series. The second output terminal 15O2 is connected to a transmission line connecting the diode D1 and the diode D2 via a transmission line.

The first output terminal 15O1 of the second rectification unit 15 is a terminal that is electrically connected to a positive terminal of the load LD. The second output terminal 15O2 of the second rectification unit 15 is a terminal that is electrically connected to a negative terminal of the load LD.

According to this configuration, the second rectification unit 15 performs full-wave rectification of an AC voltage output from the inverter 14 to a pulsating voltage. The second rectification unit 15 may employ another circuit configuration serving as a circuit that rectifies an AC voltage output from the inverter 14 to a pulsating voltage instead of the circuit configuration illustrated in FIG. 1.

The smoothing unit 16 performs smoothing of a pulsating voltage having been subjected to full-wave rectification by the second rectification unit 15 and outputs a stable DC voltage. In the example illustrated in FIG. 1, the smoothing unit 16 includes a third capacitor C3. That is, in this example, the third capacitor C3 is a smoothing capacitor. The smoothing unit 16 may have another circuit configuration serving as a circuit that performs smoothing of a pulsating voltage having been subjected to full-wave rectification by the second rectification unit 15 and outputs a stable DC voltage.

The third capacitor C3 is, for example, an electrolytic capacitor. The third capacitor C3 may be another type of capacitor instead of an electrolyte capacitor. One terminal of the third capacitor C3 is connected to the first output terminal 15O1 of the second rectification unit 15 via a transmission line. The other terminal of the third capacitor C3 is connected to the second output terminal 15O2 of the second rectification unit 15 via a transmission line. That is, the smoothing unit 16 is connected between the output terminals of the second rectification unit 15.

The load LD is connected to both ends of the third capacitor C3 via a transmission line. Specifically, a first terminal LDI1 of the load LD is connected to a transmission line connecting the first output terminal 15O1 of the second rectification unit 15 and the third capacitor C3. A second terminal LDI2 of the load LD is connected to a transmission line connecting the second output terminal 15O2 of the second rectification unit 15 and the third capacitor C3. The smoothing unit 16 inputs (supplies) a DC voltage subjected to smoothing to the load LD.

Here, the twentieth capacitor CFG is connected between the smoothing unit 16 and the frame ground FG via a transmission line. In the example illustrated in FIG. 1, the twentieth capacitor CFG is connected between the terminal which is connected to the second output terminal 15O2 of the second rectification unit 15 out of the terminals of the third capacitor C3 and the frame ground FG. The twentieth capacitor CFG may be connected between another position of the smoothing unit 16 and the frame ground FG. For example, the twentieth capacitor CFG may be connected between the terminal which is connected to the first output terminal 15O1 of the second rectification unit 15 out of the terminals of the third capacitor C3 and the frame ground FG.

The second capacitor C2 is a capacitor for curbing generation of conduction noise based on a noise current which is generated between the first coil CL1 on the primary side of the transformer T and the second coil CL2 on the secondary side of the transformer T. Capacitance of the second capacitor C2 is much greater than parasitic capacitance between the first coil CL1 and the second coil CL2. This is for curbing generation of conduction noise based on a noise current which is generated between the first coil CL1 on the primary side of the transformer T and the second coil CL2 on the secondary side of the transformer T. Here, the second capacitor C2 is, for example, a ceramic capacitor. The second capacitor C2 may be another type of capacitor instead of a ceramic capacitor.

The second capacitor C2 is connected between a transmission line between the rectifier elements and the smoothing unit 16 via a transmission line. Here, the transmission line between the rectifier elements is a transmission line connecting the source terminal of the first rectifier element RC1 and the drain terminal of the second rectifier element RC2. In the example illustrated in FIG. 1, the second capacitor C2 is connected between the transmission line between the rectifier elements and the terminal which is connected to the first output terminal 15O1 of the second rectification unit 15 out of the terminals of the third capacitor C3. The second capacitor C2 may be connected between the transmission line between the rectifier elements and the terminal which is connected to the second output terminal 15O2 of the second rectification unit 15 out of the terminals of the third capacitor C3. In the following description, for the purpose of convenience of explanation, the transmission line that connects the transmission line between the rectifier elements and the smoothing unit 16 and that is provided with the second capacitor C2 is referred to as a transmission line EL.

In this way, in the switching power supply device 1, the transmission line between the rectifier elements and the smoothing unit 16 are connected to each other via the transmission line EL. Accordingly, in the switching power supply device 1, a noise current which is generated between the first coil CL1 of the transformer T and the second coil CL2 of the transformer T flows to the first coil CL1 sequentially through the transmission line EL and the first rectification unit 13C. As a result, with the switching power supply device 1, it is possible to curb generation of the conduction noise in comparison with a case in which generation of conduction noise based on the noise current is curbed by only the filter 18.

Here, it is preferable that the second capacitor C2 be connected between the transmission line between the rectifier elements and a position at which a DC voltage smoothed by the smoothing unit 16 is stabilized out of positions on the transmission line subsequent to the smoothing unit 16. In this embodiment, the transmission line subsequent to the smoothing unit 16 is a transmission line in a stage following two input terminals of the smoothing unit 16. The position of the transmission line connecting the first output terminal 15O1 of the second rectification unit 15 and the third capacitor C3 or the position on the transmission line connecting the second output terminal 15O2 of the second rectification unit 15 and the third capacitor C3 is an example of a position at which a DC voltage smoothed by the smoothing unit 16 is stabilized out of positions on the transmission line subsequent to the smoothing unit 16.

It is preferable that a position on the smoothing unit 16 which is connected to the transmission line EL be close to the second coil CL2. This is because generation of conduction noise based on the noise current is empirically most curbed. Accordingly, in the example illustrated in FIG. 1, the transmission line EL is connected to the terminal which is connected to the first output terminal 15O1 of the second rectification unit 15 out of the terminals of the third capacitor C3 in the smoothing unit 16.

The switching power supply device 1 may employ a configuration in which a circuit element such as a resistor is connected in series to the second capacitor C2 on the transmission line EL or may employ a configuration in which a ferrite bead that converts high-frequency noise into heat is provided on the transmission line EL. The second capacitor C2 may include a plurality of capacitors which are connected in series.

The control unit 17 is, for example, a central processing unit (CPU). The control unit 17 may be another control circuit such as a field programmable gate array (FPGA), an analog integrated circuit, or an analog-digital mixed integrated circuit instead of a CPU.

The control unit 17 performs switching control of the first switching element S1, the second switching element S2, the first rectifier element RC1, the second rectifier element RC2, the switching element 14C of the inverter 14, and the switching element 14D of the inverter 14.

For example, the control unit 17 alternately switches the state of the first rectifier element RC1 and the state of the second rectifier element RC2 between an ON state and an OFF state.

That is, when the state of the first rectifier element RC1 is set to the ON state, the control unit 17 switches the state of the second rectifier element RC2 to the OFF state. When the state of the first rectifier element RC1 is set to the OFF state, the control unit 17 switches the state of the second rectifier element RC2 to the ON state. When the potential of the first terminal PSO1 of the AC power source PS is higher than the potential of the second terminal PSO2 of the AC power source PS, the control unit 17 switches the state of the first rectifier element RC1 to the OFF state and switches the state of the second rectifier element RC2 to the ON state. When the potential of the first terminal PSO1 of the AC power source PS is lower than the potential of the second terminal PSO2 of the AC power source PS, the control unit 17 switches the state of the first rectifier element RC1 to the ON state and switches the state of the second rectifier element RC2 to the OFF state. In this way, the control unit 17 performs switching of the state of the first rectifier element RC1 and the state of the second rectifier element RC2 at the same frequency as a power supply frequency of the AC power source PS. The power supply frequency is, for example, 50 Hz but is not limited thereto.

For example, the control unit 17 alternately switches the state of the first switching element S1 and the state of the second switching element S2 between an ON state and an OFF state. That is, when the state of the first switching element S1 is the ON state, the control unit 17 switches the state of the second switching element S2 to the OFF state. When the state of the first switching element S1 is set the OFF state, the control unit 17 switches the state of the second switching element S2 to the ON state. The control unit 17 performs switching of the state of the first switching element S1 and the state of the second switching element S2 at a frequency higher than the power supply frequency. The control unit 17 performs switching of the state of the first switching element S1 and the state of the second switching element S2, for example, at 100 kHz.

The control unit 17 detects a current flowing in the first inductor 13A, a voltage across the first capacitor C1, and a voltage between the input terminals of the AC voltage input unit 11 (a voltage between the first input terminal 11I1 and the second input terminal 11I2 or a voltage between the first output terminal 11O1 and the second output terminal 11O2), performs switching of the state of the first switching element S1 and the state of the second switching element S2 by pulse width modulation (PWM) control, controls a time ratio of the PWM control such that the current flowing in the first inductor 13A and the voltage between the input terminals are similar, and controls the voltage across the first capacitor C1 such that it is a constant voltage (for example, 400 V). Accordingly, the power factor correction circuit 13 performs a power factor correction operation.

When the potential of the first terminal PSO1 of the AC power source PS is higher than the potential of the second terminal PSO2 of the AC power source PS, the control unit 17 sets the second switching element S2 as a control target of the time ratio of the ON state of the PWM control and switches the state of the first switching element S1 to the ON state when the state of the second switching element S2 is set to the OFF state by the PWM control. When the potential of the first terminal PSO1 of the AC power source PS is lower than the potential of the second terminal PSO2 of the AC power source PS, the control unit 17 sets the first switching element S1 as a control target of the time ratio of the ON state of the PWM control and switches the state of the second switching element S2 to the ON state when the state of the first switching element S1 is set to the OFF state by the PWM control. In this way, the control unit 17 performs switching of the control target of the time ratio of the ON state of the PWM control at the same frequency as the power supply frequency of the AC power source PS. Details of the PWM control method and the control method for power factor correction are known and thus description thereof will be omitted.

For example, the control unit 17 alternately switches the state of the switching element 14C and the state of the switching element 14D between an ON state and an OFF state. That is, when the state of the switching element 14C is set to the ON state, the control unit 17 switches the state of the switching element 14D to the OFF state. When the state of the switching element 14C is set to the OFF state, the control unit 17 switches the state of the switching element 14D to the ON state. The inverter 14 carries out LLC resonance using leakage inductance of the transformer T, excitation inductance of the transformer T, and the capacitors 14A and 14B. The control unit 17 controls the switching frequency of the states of the switching element 14C and the switching element 14D such that the voltage between the output terminals (the voltage between the first terminal LDI1 of the load LD and the second terminal LDI2 of the load LD) is constant by pulse frequency modulation (PFM) control. Details of the PFM control method of an LLC resonance converter (a circuit in which the second rectification unit 15 is combined into the inverter 14) are known and thus description thereof will be omitted.

In FIG. 1, for the purpose of simplification of the drawing, transmission lines connecting the gate terminals of the first switching element S1, the second switching element S2, the first rectifier element RC1, the second rectifier element RC2, the switching element 14C, and the switching element 14D to the control unit 17 are not illustrated. The control unit 17 performs switching control of the first switching element S1, the second switching element S2, the first rectifier element RC1, the second rectifier element RC2, the switching element 14C, and the switching element 14D by supplying a voltage to the gate terminals of the first switching element S1, the second switching element S2, the first rectifier element RC1, the second rectifier element RC2, the switching element 14C, and the switching element 14D. In FIG. 1, for the purpose of simplification of the drawing, a current detecting circuit that detects a current flowing in the first inductor 13A and voltage detecting circuits that detect a voltage across the first capacitor C1, a voltage across the third capacitor C3 (a voltage between the output terminals (the voltage between the first terminal LDI1 of the load LD and the second terminal LDI2 of the load LD)), and a voltage between the input terminals of the AC voltage input unit 11 (the voltage between the first output terminal 11O1 and the second output terminal 11O2) are also not illustrated.

According to the above-mentioned circuit configuration, in the switching power supply device 1, a noise current which is generated between the first coil CL1 of the transformer T and the second coil CL2 of the transformer T flows to the first coil CL1 sequentially through the transmission line EL and the first rectification unit 13C. As a result, with the switching power supply device 1, it is possible to curb generation of conduction noise based on the noise current.

Figure 2:
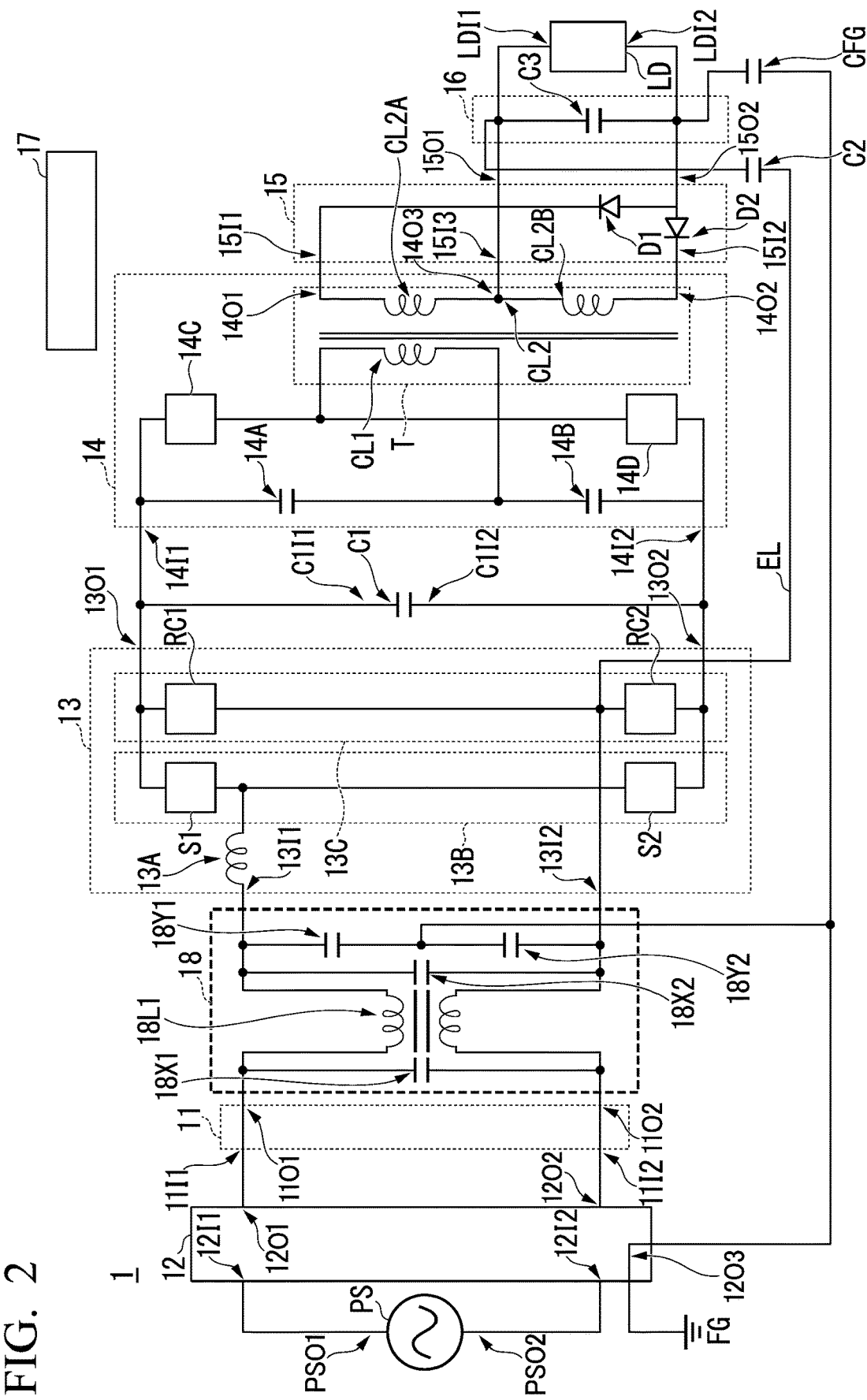
FIG. 2 is a diagram illustrating an example of a configuration of the switching power supply device 1 when conduction noise of the switching power supply device 1 is measured.

The configuration of the switching power supply device 1 when conduction noise in the switching power supply device 1 is measured will be described below. FIG. 2 is a diagram illustrating an example of the configuration of the switching power supply device 1 when conduction noise in the switching power supply device 1 is measured. The configuration of the switching power supply device 1 illustrated in FIG. 2 is obtained by adding a line impedance stabilization network (LISN) 12 between the AC power source PS and the AC voltage input unit 11 in the configuration of the switching power supply device 1 illustrated in FIG. 1.

The LISN 12 is a line impedance stabilization network. The LISN 12 performs stabilization of impedance of power supply lines in the switching power supply device 1. Accordingly, the LISN 12 enables detection of conduction noise which flows between the AC power source PS and the AC voltage input unit 11. The LISN 12 may have an existing configuration or may have a configuration which will be developed from now on, as long as it can perform stabilization of impedance in the power supply lines.

The LISN 12 includes two input terminals including a first input terminal 12I1 and a second input terminal 12I2. The LISN 12 includes two output terminals including a first output terminal 12O1 and a second output terminal 12O2. The LISN 12 further includes an FG terminal 12O3.

In the example illustrated in FIG. 2, the first input terminal 12I1 is connected to the first terminal PSO1 of the AC power source PS via a transmission line. In the example, the second input terminal 12I2 is connected to the second terminal PSO2 of the AC power source PS via a transmission line. The first output terminal 12O1 is connected to the first input terminal 11I1 of the AC voltage input unit 11 via a transmission line. The second output terminal 12O2 is connected to the second input terminal 11I2 of the AC voltage input unit 11 via a transmission line.

The LISN 12 outputs an AC voltage input to the first input terminal 12I1 from the first output terminal 12O1. The LISN 12 outputs an AC voltage input to the second input terminal 12I2 from the second output terminal 12O2. The frame ground FG is connected to the FG terminal 12O3 of the LISN 12. Here, the twentieth capacitor CFG is connected to the LISN 12 via a transmission line. The twentieth capacitor CFG is electrically connected to the FG terminal 12O3 of the LISN 12. That is, the twentieth capacitor CFG is connected to the frame ground FG via the FG terminal 12O3. In a conduction noise measurement test of the switching power supply device 1 illustrated in FIG. 2, measurement is performed using an electromagnetic shield space (a shield room).

Figure 3:
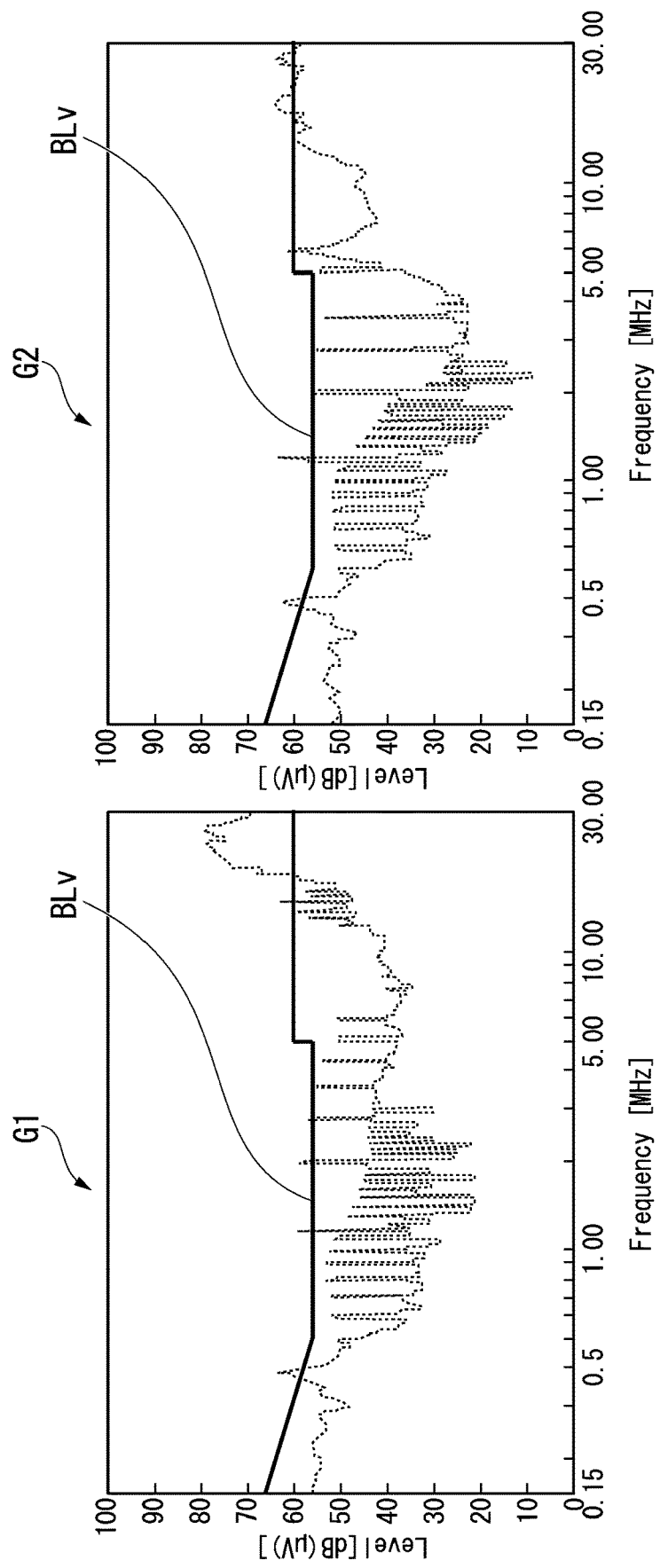
FIG. 3 is a diagram illustrating an example of conduction noise which is generated in the switching power supply device 1 when a transmission line EL is not provided and when a transmission line EL is provided.

FIG. 3 is a diagram illustrating an example of conduction noise which is generated in the switching power supply device 1 when the transmission line EL is not provided and when the transmission line EL is provided. FIG. 3 illustrates results of a conduction noise measurement test of the switching power supply device 1 illustrated in FIG. 2 using an electromagnetic shield space. A graph G1 illustrated in FIG. 3 represents an example of conduction noise which is generated in the switching power supply device 1 when the transmission line EL is not provided. The horizontal axis of the graph G1 represents a frequency of conduction noise. The vertical axis of the graph G1 represents a level of conduction noise which is expressed in dB(μV). The line BLv illustrated in the graph G1 indicates an allowable value which is determined by the standard such as ITE/standard: CISPR32 Class B. That is, it is preferable that the level of conduction noise in the switching power supply device 1 is suppressed to be lower than the line BLv in each frequency band.

On the other hand, a graph G2 illustrated in FIG. 3 represents an example of conduction noise which is generated in the switching power supply device 1 when the transmission line EL is provided. The horizontal axis of the graph G2 represents a frequency of conduction noise. The vertical axis of the graph G2 represents a level of conduction noise which is expressed in dB(μV).

From comparison between the graph G1 and the graph G2, it can be seen that conduction noise which is generated in the switching power supply device 1 can be curbed by providing the transmission line EL in the switching power supply device 1.

Modified Example 1 of Embodiment

Figure 4:
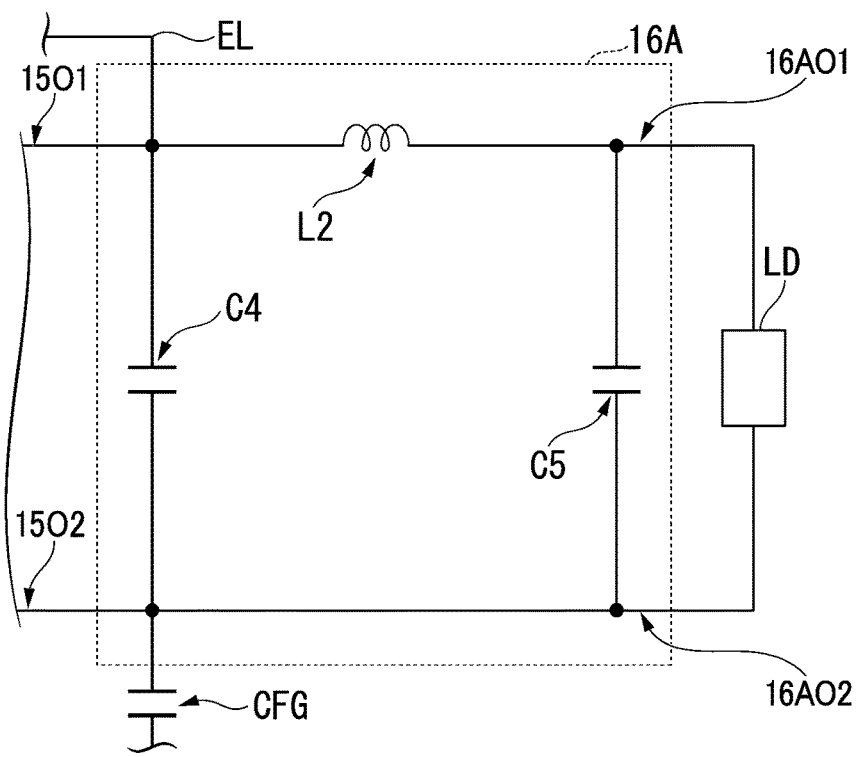
FIG. 4 is a diagram illustrating an example of a circuit configuration of a smoothing unit 16A according to Modified Example 1 of the embodiment.

Modified Example 1 of the embodiment will be described below with reference to FIG. 4. In Modified Example 1 of the embodiment, the same constituent elements as in the embodiment will be referred to by the same reference signs and description thereof will not be repeated. In Modified Example 1 of the embodiment, the switching power supply device 1 includes a smoothing unit 16A illustrated in FIG. 4 instead of the smoothing unit 16. FIG. 4 is a diagram illustrating an example of a circuit configuration of the smoothing unit 16A according to Modified Example 1 of the embodiment.

The smoothing unit 16A includes a fourth capacitor C4, a fifth capacitor C5, and a second inductor L2.

The fourth capacitor C4 is, for example, an electrolytic capacitor. The fourth capacitor C4 may be another type of capacitor instead of an electrolytic capacitor.

The fifth capacitor C5 is, for example, an electrolytic capacitor. The fifth capacitor C5 may be another type of capacitor instead of an electrolytic capacitor.

The fourth capacitor C4 is connected between the output terminals of the second rectification unit 15 via a transmission line. The second inductor L2 is connected to a terminal which is connected to the first output terminal 15O1 of the second rectification unit 15 out of terminals of the fourth capacitor C4. The first output terminal 16AO1 of the smoothing unit 16A is connected to a terminal which is not connected to the fourth capacitor C4 out of terminals of the second inductor L2. The second output terminal 16AO2 of the smoothing unit 16A is connected to the terminal which is connected to the second output terminal 15O2 of the second rectification unit 15 out of the terminals of the fourth capacitor C4. The fifth capacitor C5 is connected between the output terminals of the smoothing unit 16A.

In the example illustrated in FIG. 4, the transmission line EL is connected between the transmission line between the rectifier elements and the terminal which is connected to the first output terminal 15O1 of the second rectification unit 15 out of the terminals of the fourth capacitor C4. That is, in the example, the second capacitor C2 is connected between the transmission line between the rectifier elements and the terminal which is connected to the first output terminal 15O1 of the second rectification unit 15 out of the terminals of the fourth capacitor C4. In the example, the twentieth capacitor CFG is connected between the terminal which is connected to the second output terminal 15O2 of the second rectification unit 15 out of the terminals of the fourth capacitor C4 and the frame ground FG which is not illustrated in FIG. 4.

According to the above-mentioned circuit configuration, in the switching power supply device 1 according to Modified Example 1 of the embodiment, a noise current which is generated between the first coil CL1 of the transformer T and the second coil CL2 of the transformer T flows to the first coil CL1 sequentially through the transmission line EL and the first rectification unit 13C. As a result, with the switching power supply device 1, it is possible to curb generation of conduction noise based on the noise current.

In the switching power supply device 1 according to Modified Example 1 of the embodiment, the second capacitor C2 may be connected between the transmission line between the rectifier elements and the terminal which is connected to the second output terminal 15O2 of the second rectification unit 15 out of the terminals of the fourth capacitor C4 via a transmission line. In the switching power supply device 1, the second capacitor C2 may be connected between the transmission line between the rectifier elements and the terminal which is connected to the first output terminal 15O1 of the second rectification unit 15 via the second inductor L2 out of the terminals of the fifth capacitor C5 via a transmission line. In the switching power supply device 1, the second capacitor C2 may be connected between the transmission line between the rectifier elements and the terminal which is connected to the second output terminal 15O2 of the second rectification unit 15 out of the terminals of the fifth capacitor C5 via a transmission line.

Here, it is preferable that the second capacitor C2 be connected between the transmission line between the rectifier elements and a position at which a DC voltage smoothed by the smoothing unit 16A is stabilized out of positions of the transmission line subsequent to the smoothing unit 16A. In this embodiment, the transmission line subsequent to the smoothing unit 16A is a transmission line in a stage following two input terminals of the smoothing unit 16A. One of four terminals including two terminals of the fourth capacitor C4 and two terminals of the fifth capacitor C5 is an example of the position at which a DC voltage smoothed by the smoothing unit 16A is stabilized out of positions on the transmission line subsequent to the smoothing unit 16A.

It is preferable that a position on the smoothing unit 16A which is connected to the transmission line EL be close to the second coil CL2. This is because generation of conduction noise based on the noise current is empirically most curbed. Accordingly, in the example illustrated in FIG. 4, the transmission line EL is connected to the terminal which is connected to the first output terminal 15O1 of the second rectification unit 15 out of the terminals of the fourth capacitor C4 in the smoothing unit 16A.

In the smoothing unit 16A illustrated in FIG. 4, the position which is connected to the second inductor L2 may be a position which is different from the position illustrated in FIG. 4.

For example, the second inductor L2 may be connected to the terminal which is connected to the second output terminal 15O2 out of the terminals of the fourth capacitor C4. In this case, the first output terminal 16AO1 of the smoothing unit 16A is connected to the terminal which is connected to the first output terminal 15O1 of the second rectification unit 15 out of the terminals of the fourth capacitor C4. In this case, the second output terminal 16AO2 of the smoothing unit 16A is connected to the terminal which is not connected to the fourth capacitor C4 out of the terminals of the second inductor L2. In this case, the fifth capacitor C5 is connected between the output terminals of the smoothing unit 16A (that is, between the first output terminal 16AO1 and the second output terminal 16AO2).

Modified Example 2 of Embodiment

Figure 5:
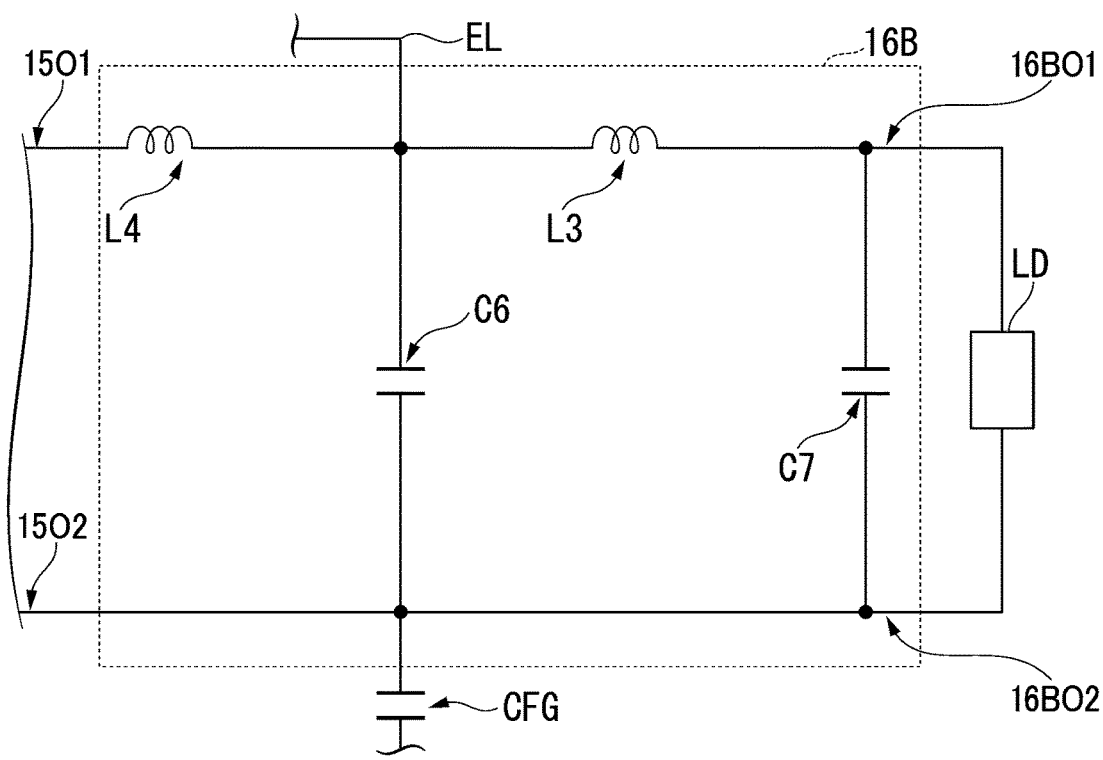
FIG. 5 is a diagram illustrating an example of a circuit configuration of a smoothing unit 16B according to Modified Example 2 of the embodiment.

Modified Example 2 of the embodiment will be described below with reference to FIG. 5. In Modified Example 2 of the embodiment, the same constituent elements as in the embodiment will be referred to by the same reference signs and description thereof will not be repeated. In Modified Example 2 of the embodiment, the switching power supply device 1 includes a smoothing unit 16B illustrated in FIG. 5 instead of the smoothing unit 16. FIG. 5 is a diagram illustrating an example of a circuit configuration of the smoothing unit 16B according to Modified Example 2 of the embodiment.

The smoothing unit 16B includes a sixth capacitor C6, a seventh capacitor C7, a third inductor L3, and a fourth inductor L4.

The sixth capacitor C6 is, for example, an electrolytic capacitor. The sixth capacitor C6 may be another type of capacitor instead of an electrolytic capacitor.

The seventh capacitor C7 is, for example, an electrolytic capacitor. The seventh capacitor C7 may be another type of capacitor instead of an electrolytic capacitor.

The fourth inductor L4 is connected to the first output terminal 15O1 of the second rectification unit 15. The sixth capacitor C6 is connected between the terminal which is not connected to the first output terminal 15O1 of the second rectification unit 15 out of the terminals of the fourth inductor L4 and the second output terminal 15O2 of the second rectification unit 15. The third inductor L3 is connected to the terminal which is connected to the fourth inductor L4 out of the terminals of the sixth capacitor C6. A first output terminal 16BO1 of the smoothing unit 16B is connected to the terminal which is not connected to the sixth capacitor C6 out of the terminals of the third inductor L3. A second output terminal 16BO2 of the smoothing unit 16B is connected to the terminal which is connected to the second output terminal 15O2 of the second rectification unit 15 out of the terminals of the sixth capacitor C6. The seventh capacitor C7 is connected between the output terminals of the smoothing unit 16B.

In the example illustrated in FIG. 5, the transmission line EL is connected between the transmission line between the rectifier elements and the terminal which is connected to the fourth inductor L4 out of the terminals of the sixth capacitor C6. That is, in the example, the second capacitor C2 is connected between the transmission line between the rectifier elements and the terminal which is connected to the fourth inductor L4 out of the terminals of the sixth capacitor C6. In the example, the twentieth capacitor CFG is connected between the terminal which is connected to the second output terminal 15O2 of the second rectification unit 15 out of the terminals of the sixth capacitor C6 and the frame ground FG which is not illustrated in FIG. 5.

According to the above-mentioned circuit configuration, in the switching power supply device 1 according to Modified Example 2 of the embodiment, a noise current which is generated between the first coil CL1 on the primary side of the transformer T and the second coil CL2 on the secondary side of the transformer T flows to the first coil CL1 sequentially through the transmission line EL and the first rectification unit 13C. As a result, with the switching power supply device 1, it is possible to curb generation of conduction noise based on the noise current.

In the switching power supply device 1 according to Modified Example 2 of the embodiment, the second capacitor C2 may be connected between the transmission line between the rectifier elements and the terminal which is connected to the second output terminal 15O2 of the second rectification unit 15 out of the terminals of the sixth capacitor C6. In the switching power supply device 1, the second capacitor C2 may be connected between the transmission line between the rectifier elements and the terminal which is connected to the third inductor L3 out of the terminals of the seventh capacitor C7. In the switching power supply device 1, the second capacitor C2 may be connected between the transmission line between the rectifier elements and the terminal which is connected to the second output terminal 15O2 of the second rectification unit 15 out of the terminals of the seventh capacitor C7.

Here, it is preferable that the second capacitor C2 be connected between the transmission line between the rectifier elements and a position at which a DC voltage smoothed by the smoothing unit 16B is stabilized out of positions on the transmission line subsequent to the smoothing unit 16B. In this embodiment, the transmission line subsequent to the smoothing unit 16B is a transmission line in a stage following two input terminals of the smoothing unit 16B. One of four terminals including two terminals of the sixth capacitor C6 and two terminals of the seventh capacitor C7 is an example of the position at which a DC voltage smoothed by the smoothing unit 16B is stabilized out of positions on the transmission line subsequent to the smoothing unit 16B.

It is preferable that a position on the smoothing unit 16B which is connected to the transmission line EL be close to the second coil CL2. This is because generation of conduction noise based on the noise current is empirically further curbed. Accordingly, in the example illustrated in FIG. 5, the transmission line EL is connected to the terminal which is connected to the fourth inductor L4 out of the terminals of the sixth capacitor C6 in the smoothing unit 16B.

In the smoothing unit 16B illustrated in FIG. 5, the position which is connected to the fourth inductor L4 may be a position which is different from the position illustrated in FIG. 5.

For example, the fourth inductor L4 may be connected to the second output terminal 15O2 of the second rectification unit 15 instead of the first output terminal 15O1 of the second rectification unit 15. In this case, the sixth capacitor C6 is connected to the terminal which is not connected to the second output terminal 15O2 of the second rectification unit 15 out of the terminals of the fourth inductor L4. In this case, the first output terminal 15O1 of the second rectification unit 15 is connected to the terminal which is not connected to the fourth inductor L4 out of the terminals of the sixth capacitor C6. In this case, the third inductor L3 is connected to the terminal which is connected to the first output terminal 15O1 of the second rectification unit 15 out of the terminals of the sixth capacitor C6. In this case, the first output terminal 16BO1 of the smoothing unit 16B is connected to the terminal which is not connected to the sixth capacitor C6 out of the terminals of the third inductor L3. In this case, the second output terminal 16BO2 of the smoothing unit 16B is connected to the terminal which is connected to the fourth inductor L4 out of the terminals of the sixth capacitor C6. In this case, the seventh capacitor C7 is connected between the output terminals of the smoothing unit 16B.

In the smoothing unit 16B illustrated in FIG. 5, the position which is connected to the third inductor L3 may be a position which is different from the position illustrated in FIG. 5.

For example, the third inductor L3 may be connected between the terminal which is connected to the second output terminal 15O2 out of the terminals of the sixth capacitor C6 and the second output terminal 16BO2 of the smoothing unit 16B. In this case, the terminal which is connected to the first output terminal 15O1 out of the terminals of the sixth capacitor C6 is connected to the first output terminal 16BO1 of the smoothing unit 16B. In this case, the seventh capacitor C7 is connected between the output terminals of the smoothing unit 16B.

In the smoothing unit 16B illustrated in FIG. 5, the positions which is connected to the third inductor L3 and the fourth inductor L4 may be positions which are different from the positions illustrated in FIG. 5.

For example, the fourth inductor L4 may be connected to the second output terminal 15O2 instead of the first output terminal 15O1. The third inductor L3 may be connected to the terminal which is not connected to the second output terminal 15O2 out of the terminals of the fourth inductor L4. In this case, the sixth capacitor C6 is connected between the terminal which is not connected to the second output terminal 15O2 of the second rectification unit 15 out of the terminals of the fourth inductor L4 and the first output terminal 15O1 of the second rectification unit 15. In this case, the first output terminal 16BO1 of the smoothing unit 16B is connected to the terminal which is connected to the first output terminal 15O1 of the second rectification unit 15 out of the terminals of the sixth capacitor C6. In this case, the second output terminal 16BO2 of the smoothing unit 16B is connected to the terminal which is not connected to the sixth capacitor C6 out of the terminals of the third inductor L3. In this case, the seventh capacitor C7 is connected between the output terminals of the smoothing unit 16B.

Modified Example 3 of Embodiment

Figure 6:
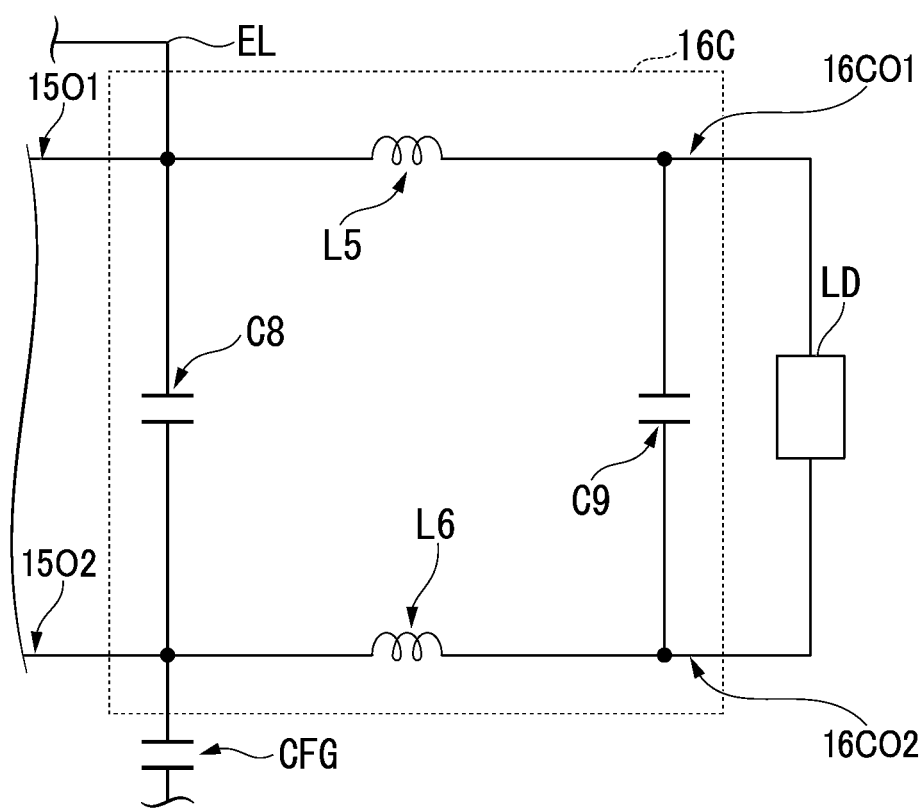
FIG. 6 is a diagram illustrating an example of a circuit configuration of a smoothing unit 16C according to Modified Example 3 of the embodiment.

Modified Example 3 of the embodiment will be described below with reference to FIG. 6. In Modified Example 3 of the embodiment, the same constituent elements as in the embodiment will be referred to by the same reference signs and description thereof will not be repeated. In Modified Example 3 of the embodiment, the switching power supply device 1 includes a smoothing unit 16C illustrated in FIG. 6 instead of the smoothing unit 16. FIG. 6 is a diagram illustrating an example of a circuit configuration of the smoothing unit 16C according to Modified Example 3 of the embodiment.

The smoothing unit 16C includes an eighth capacitor C8, a ninth capacitor C9, a fifth inductor L5, and a sixth inductor L6.

The eighth capacitor C8 is, for example, an electrolytic capacitor. The eighth capacitor C8 may be another type of capacitor instead of an electrolytic capacitor.

The ninth capacitor C9 is, for example, an electrolytic capacitor. The ninth capacitor C9 may be another type of capacitor instead of an electrolytic capacitor.

The eighth capacitor C8 is connected between the output terminals of the second rectification unit 15. The fifth inductor L5 is connected to the terminal which is connected to the first output terminal 15O1 of the second rectification unit 15 out of the terminals of the eighth capacitor C8. The sixth inductor L6 is connected to the terminal which is connected to the second output terminal 15O2 of the second rectification unit 15 out of the terminals of the eighth capacitor C8. A first output terminal 16CO1 of the smoothing unit 16C is connected to the terminal which is not connected to the eighth capacitor C8 out of the terminals of the fifth inductor L5. A second output terminal 16CO2 of the smoothing unit 16C is connected to the terminal which is not connected to the eighth capacitor C8 out of the terminals of the sixth inductor L6. The ninth capacitor C9 is connected between the output terminals of the smoothing unit 16C.

In the example illustrated in FIG. 6, the transmission line EL is connected between the transmission line between the rectifier elements and the terminal which is connected to the first output terminal 15O1 of the second rectification unit 15 out of the terminals of the eighth capacitor C8. That is, in the example, the second capacitor C2 is connected between the transmission line between the rectifier elements and the terminal which is connected to the first output terminal 15O1 of the second rectification unit 15 out of the terminals of the eighth capacitor C8. In the example, the twentieth capacitor CFG is connected between the terminal which is connected to the second output terminal 15O2 of the second rectification unit 15 out of the terminals of the eighth capacitor C8 and the frame ground FG which is not illustrated in FIG. 6.

According to the above-mentioned circuit configuration, in the switching power supply device 1 according to Modified Example 3 of the embodiment, a noise current which is generated between the first coil CL1 on the primary side of the transformer T and the second coil CL2 on the secondary side of the transformer T flows to the first coil CL1 sequentially through the transmission line EL and the first rectification unit 13C. As a result, with the switching power supply device 1, it is possible to curb generation of conduction noise based on the noise current.

In the switching power supply device 1 according to Modified Example 3 of the embodiment, the second capacitor C2 may be connected between the transmission line between the rectifier elements and the terminal which is connected to the second output terminal 15O2 of the second rectification unit 15 out of the terminals of the eighth capacitor C8. In the switching power supply device 1, the second capacitor C2 may be connected between the transmission line between the rectifier elements and the terminal which is connected to the fifth inductor L5 out of the terminals of the ninth capacitor C9. In the switching power supply device 1, the second capacitor C2 may be connected between the transmission line between the rectifier elements and the terminal which is connected to the sixth inductor L6 out of the terminals of the ninth capacitor C9.

Here, it is preferable that the second capacitor C2 be connected between the transmission line between the rectifier elements and a position at which a DC voltage smoothed by the smoothing unit 16C is stabilized out of positions on the transmission line subsequent to the smoothing unit 16C. In this embodiment, the transmission line subsequent to the smoothing unit 16C is a transmission line in a stage following two input terminals of the smoothing unit 16C. One of four terminals including two terminals of the eighth capacitor C8 and two terminals of the ninth capacitor C9 is an example of the position at which a DC voltage smoothed by the smoothing unit 16C is stabilized out of positions on the transmission line subsequent to the smoothing unit 16C.

It is preferable that a position on the smoothing unit 16C which is connected to the transmission line EL be close to the second coil CL2. This is because generation of conduction noise based on the noise current is empirically most curbed. Accordingly, in the example illustrated in FIG. 6, the transmission line EL is connected to the terminal which is connected to the first output terminal 15O1 of the second rectification unit 15 out of the terminals of the eighth capacitor C8 in the smoothing unit 16C.

Modified Example 4 of Embodiment

Modified Example 4 of the embodiment will be described below. In Modified Example 4 of the embodiment, the same constituent elements as in the embodiment will be referred to by the same reference signs and description thereof will not be repeated. In Modified Example 4 of the embodiment, the switching power supply device 1 includes a first rectifier element RC1A instead of the first rectifier element RC1. In Modified Example 4 of the embodiment, the switching power supply device 1 includes a second rectifier element RC2A instead of the second rectifier element RC2.

The first rectifier element RC1A is a diode.

The second rectifier element RC2A is a diode.

In the switching power supply device 1 Modified Example 4 of the embodiment, the anode of the first rectifier element RC1A is connected to the cathode of the second rectifier element RC2A. The cathode of the first rectifier element RC1A is connected to a transmission line connecting the drain terminal of the first switching element S1 and the first terminal C1I1 of the first capacitor C1. The anode of the second rectifier element RC2A is connected to a transmission line connecting the source terminal of the second switching element S2 and the second terminal C1I2 of the second capacitor C2.

In this way, in the switching power supply device 1, even when the first rectifier element RC1A is provided instead of the first rectifier element RC1 and the second rectifier element RC2A is provided instead of the second rectifier element RC2, a noise current which is generated between the first coil CL1 on the primary side of the transformer T and the second coil CL2 on the secondary side of the transformer T flows to the first coil CL1 sequentially through the transmission line EL and the first rectification unit 13C. As a result, with the switching power supply device 1, it is possible to curb generation of conduction noise based on the noise current.

The switching power supply device 1 according to the embodiment has a simpler circuit configuration than the switching power supply device 1 according to Modified Examples 1 to 3 of the embodiment. Accordingly, in the switching power supply device 1 according to the embodiment, it is possible to suppress an increase in manufacturing cost in comparison with the switching power supply device 1 according to Modified Examples 1 to 3 of the embodiment.

As described above, the switching power supply device according to the embodiment is a switching power supply device that is connected to a load and supplies a DC voltage to the load, the switching power supply device including: an AC voltage input unit that is supplied with an AC voltage; a filter that is connected to the AC voltage input unit and a frame ground and is supplied with the AC voltage from the AC voltage input unit; a first inductor that is electrically connected to a first output terminal of the AC voltage input unit via the filter; a switching unit that includes a first switching element and a second switching element, in which the first switching element and the second switching element are connected in series to each other, and of which a terminal which is not electrically connected to the first output terminal of the AC voltage input unit out of two terminals of the first inductor is connected to a transmission line connecting the first switching element and the second switching element; a first rectification unit that includes a first rectifier element and a second rectifier element, in which the first rectifier element and the second rectifier element are connected in series, in which a second output terminal of the AC voltage input unit is electrically connected to a transmission line connecting the first rectifier element and the second rectifier element via the filter, and that is connected in parallel to the switching unit; a first capacitor that is connected in parallel to the first rectification unit; an inverter that includes a transformer including a primary coil and a secondary coil and in which the first capacitor is connected between input terminals thereof; a second rectification unit that includes an input terminal which is connected to the secondary coil; a smoothing unit that is connected between the first and second output terminals of the second rectification unit; a control unit that performs switching control of the first switching element, the second switching element, and a switching element of the inverter; a second capacitor that is connected between a transmission line connecting the first rectifier element and the second rectifier element and the smoothing unit; and a twentieth capacitor that is connected between the smoothing unit and the frame ground. Accordingly, with the switching power supply device, it is possible to curb generation of conduction noise based on a noise current which is generated between a primary coil and a secondary coil of a transformer.

The switching power supply device may employ a configuration in which the smoothing unit includes a third capacitor that is connected between the first and second output terminals of the second rectification unit, and the second capacitor is connected between a transmission line connecting the first rectifier element and the second rectifier element and one terminal of the third capacitor.

The switching power supply device may employ a configuration in which the smoothing unit includes: a fourth capacitor that is connected between the first and second output terminals of the second rectification unit; a second inductor that is connected to a terminal which is connected to a first output terminal of the second rectification unit out of terminals of the fourth capacitor; a first output terminal of the smoothing unit that is connected to a terminal which is not connected to the fourth capacitor out of terminals of the second inductor; a second output terminal of the smoothing unit that is connected to a terminal which is connected to a second output terminal of the second rectification unit out of the terminals of the fourth capacitor; and a fifth capacitor that is connected between the first and second output terminals of the smoothing unit, and the second capacitor is connected between a transmission line connecting the first rectifier element and the second rectifier element and one of four terminals including both terminals of the fourth capacitor and both terminals of the fifth capacitor.

The switching power supply device may employ a configuration in which the smoothing unit includes: a fourth capacitor that is connected between the first and second output terminals of the second rectification unit; a second inductor that is connected to a terminal which is connected to a second output terminal of the second rectification unit out of terminals of the fourth capacitor; a first output terminal of the smoothing unit that is connected to a terminal which is connected to a first output terminal of the second rectification unit out of the terminals of the fourth capacitor; a second output terminal of the smoothing unit that is connected to a terminal which is not connected to the fourth capacitor out of terminals of the second inductor; and a fifth capacitor that is connected between the first and second output terminals of the smoothing unit, and the second capacitor is connected between a transmission line connecting the first rectifier element and the second rectifier element and one of four terminals including both terminals of the fourth capacitor and both terminals of the fifth capacitor.

The switching power supply device may employ a configuration in which the smoothing unit includes: a fourth inductor that is connected to a first output terminal of the second rectification unit; a sixth capacitor that is connected between a terminal which is not connected to the first output terminal of the second rectification unit out of terminals of the fourth inductor and a second output terminal of the second rectification unit; a third inductor that is connected to a terminal which is connected to the fourth inductor out of terminals of the sixth capacitor; a first output terminal of the smoothing unit that is connected to a terminal which is not connected to the sixth capacitor out of terminals of the third inductor; a second output terminal of the smoothing unit that is connected to a terminal which is connected to the second output terminal of the second rectification unit out of the terminals of the sixth capacitor; and a seventh capacitor that is connected between the first and second output terminals of the smoothing unit, and the second capacitor is connected between a transmission line connecting the first rectifier element and the second rectifier element and one of four terminals including both terminals of the sixth capacitor and both terminals of the seventh capacitor.

The switching power supply device may employ a configuration in which the smoothing unit includes: a fourth inductor that is connected to a second output terminal of the second rectification unit; a sixth capacitor that is connected between a terminal which is not connected to the second output terminal of the second rectification unit out of terminals of the fourth inductor and a first output terminal of the second rectification unit; a third inductor that is connected to a terminal which is connected to the first output terminal of the second rectification unit out of terminals of the sixth capacitor; a first output terminal of the smoothing unit that is connected to a terminal which is not connected to the sixth capacitor out of terminals of the third inductor; a second output terminal of the smoothing unit that is connected to a terminal which is connected to the fourth inductor out of the terminals of the sixth capacitor; and a seventh capacitor that is connected between the first and second output terminals of the smoothing unit, and the second capacitor is connected between a transmission line connecting the first rectifier element and the second rectifier element and one of four terminals including both terminals of the sixth capacitor and both terminals of the seventh capacitor.

The switching power supply device may employ a configuration in which the smoothing unit includes: a fourth inductor that is connected to a first output terminal of the second rectification unit; a sixth capacitor that is connected between a terminal which is not connected to the first output terminal of the second rectification unit out of terminals of the fourth inductor and a second output terminal of the second rectification unit; a third inductor that is connected to a terminal which is connected to the second output terminal of the second rectification unit out of terminals of the sixth capacitor; a first output terminal of the smoothing unit that is connected to a terminal connected to the fourth inductor out of terminals of the sixth capacitor; a second output terminal of the smoothing unit that is connected to a terminal not connected to the sixth capacitor out of terminals of the third inductor; and a seventh capacitor that is connected between the first and second output terminals of the smoothing unit, and the second capacitor is connected between a transmission line connecting the first rectifier element and the second rectifier element and one of four terminals including both terminals of the sixth capacitor and both terminals of the seventh capacitor.

The switching power supply device may employ a configuration in which the smoothing unit includes: a fourth inductor that is connected to a second output terminal of the second rectification unit; a sixth capacitor that is connected between a terminal which is not connected to the second output terminal of the second rectification unit out of terminals of the fourth inductor and a first output terminal of the second rectification unit; a third inductor that is connected to a terminal which is connected to the fourth inductor out of terminals of the sixth capacitor; a first output terminal of the smoothing unit that is connected to a terminal connected to the first output terminal of the second rectification unit out of terminals of the sixth capacitor; a second output terminal of the smoothing unit that is connected to a terminal which is not connected to the sixth capacitor out of the terminals of the third inductor; and a seventh capacitor that is connected between the first and second output terminals of the smoothing unit, and the second capacitor is connected between a transmission line connecting the first rectifier element and the second rectifier element and one of four terminals including both terminals of the sixth capacitor and both terminals of the seventh capacitor.

The switching power supply device may employ a configuration in which the smoothing unit includes: an eighth capacitor that is connected between the first and second output terminals of the second rectification unit; a fifth inductor that is connected to a terminal which is connected to a first output terminal of the second rectification unit out of terminals of the eighth capacitor; a sixth inductor that is connected to a terminal which is connected to a second output terminal of the second rectification unit out of the terminals of the eighth capacitor; a first output terminal of the smoothing unit that is connected to a terminal which is not connected to the eighth capacitor out of terminals of the fifth inductor; a second output terminal of the smoothing unit that is connected to a terminal which is not connected to the eighth capacitor out of terminals of the sixth inductor; and a ninth capacitor that is connected between the first and second output terminals of the smoothing unit, and the second capacitor is connected between a transmission line connecting the first rectifier element and the second rectifier element and one of four terminals including both terminals of the eighth capacitor and both terminals of the ninth capacitor.

The switching power supply device may employ a configuration in which the first rectifier element and the second rectifier element are switching elements, and the control unit performs switching control of the first switching element, the second switching element, and a switching element of the inverter and performs switching control of the first rectifier element and the second rectifier element.

While an embodiment of the invention has been described above in detail with reference to the drawings, a specific configuration of the invention is not limited to the embodiment and may be modified, replaced, or deleted without departing from the gist of the invention.

EXPLANATION OF REFERENCES

1 Switching power supply device
11 AC voltage input unit
13 Power factor correction circuit
13A First inductor
13B Switching unit
13C First rectification unit
14 Inverter
14A, 14B Capacitor
14C, 14D Switching element
15 Second rectification unit
16, 16A, 16B, 16C Smoothing unit
17 Control unit
18 Filter
18C1, 18C2 Coil
18L1 Common-mode choke coil
18X1 Capacitor
18X2 Tenth capacitor
18Y1 Eleventh capacitor
18Y2 Twelfth capacitor C1 First capacitor
C2 Second capacitor
C3 Third capacitor
C4 Fourth capacitor
C5 Fifth capacitor
C6 Sixth capacitor
C7 Seventh capacitor
C8 Eighth capacitor
C9 Ninth capacitor
CFG Twentieth capacitor
CL1 First coil
CL2 Second coil
CL2A 2A-th coil
CL2B 2B-th coil
D1, D2 Diode
EL Transmission line
L2 Second inductor
L3 Third inductor
L4 Fourth inductor
L5 Fifth inductor
L6 Sixth inductor
LD Load
PS AC power source
RC1 First rectifier element
RC1A first rectifier element
RC2 Second rectifier element
RC2A Second rectifier element
S1 First switching element
S2 Second switching element
T Transformer

What is claimed is:

1. A switching power supply device that is connected to a load and supplies a direct current (DC) voltage to the load, the switching power supply device comprising: an alternating current (AC) voltage input unit that is supplied with an AC voltage; a filter that is connected to the AC voltage input unit and a frame ground and is supplied with the AC voltage from the AC voltage input unit; a first inductor that is electrically connected to a first output terminal of the AC voltage input unit via the filter; a switching unit that includes a first switching element and a second switching element, in which the first switching element and the second switching element are connected in series to each other, and of which a terminal which is not electrically connected to the first output terminal of the AC voltage input unit out of two terminals of the first inductor is connected to a transmission line, which connects the first switching element and the second switching element; a first rectification unit that includes a first rectifier element and a second rectifier element, in which the first rectifier element and the second rectifier element are connected in series, in which a second output terminal of the AC voltage input unit is electrically connected to a transmission line connecting the first rectifier element and the second rectifier element via the filter, and which is connected in parallel to the switching unit; a first capacitor that is connected in parallel to the first rectification unit; an inverter that includes a transformer including a primary coil and a secondary coil and in which the first capacitor is connected between input terminals thereof; a second rectification unit that includes an input terminal which is connected to the secondary coil; a smoothing unit that is connected between the first and second output terminals of the second rectification unit; a control unit that performs switching control of the first switching element, the second switching element, and a switching element of the inverter; a second capacitor that is connected between a transmission line, which connects the first rectifier element and the second rectifier element, and the smoothing unit; and a capacitor that is connected between the smoothing unit and the frame ground.

2. The switching power supply device according to claim 1, wherein the smoothing unit includes a third capacitor that is connected between the first and second output terminals of the second rectification unit, and
wherein the second capacitor is connected between a transmission line, which connects the first rectifier element and the second rectifier element, and one terminal of the third capacitor.

3. The switching power supply device according to claim 1, wherein the smoothing unit includes:
a fourth capacitor that is connected between the first and second output terminals of the second rectification unit;
a second inductor that is connected to a terminal which is connected to a first output terminal of the second rectification unit out of terminals of the fourth capacitor;
a first output terminal of the smoothing unit that is connected to a terminal which is not connected to the fourth capacitor out of terminals of the second inductor;
a second output terminal of the smoothing unit that is connected to a terminal which is connected to a second output terminal of the second rectification unit out of the terminals of the fourth capacitor; and
a fifth capacitor that is connected between the first and second output terminals of the smoothing unit, and
wherein the second capacitor is connected between a transmission line, which connects the first rectifier element and the second rectifier element, and one of four terminals including both terminals of the fourth capacitor and both terminals of the fifth capacitor.

4. The switching power supply device according to claim 1, wherein the smoothing unit includes:
a fourth capacitor that is connected between the first and second output terminals of the second rectification unit;
a second inductor that is connected to a terminal which is connected to a second output terminal of the second rectification unit out of terminals of the fourth capacitor;
a first output terminal of the smoothing unit that is connected to a terminal which is connected to a first output terminal of the second rectification unit out of the terminals of the fourth capacitor;
a second output terminal of the smoothing unit that is connected to a terminal which is not connected to the fourth capacitor out of terminals of the second inductor; and
a fifth capacitor that is connected between the first and second output terminals of the smoothing unit, and
wherein the second capacitor is connected between a transmission line, which connects the first rectifier element and the second rectifier element, and one of four terminals including both terminals of the fourth capacitor and both terminals of the fifth capacitor.

5. The switching power supply device according to claim 1, wherein the smoothing unit includes:
a fourth inductor that is connected to a first output terminal of the second rectification unit;
a sixth capacitor that is connected between a terminal which is not connected to the first output terminal of the second rectification unit out of terminals of the fourth inductor and a second output terminal of the second rectification unit;

a third inductor that is connected to a terminal which is connected to the fourth inductor out of terminals of the sixth capacitor;

a first output terminal of the smoothing unit that is connected to a terminal which is not connected to the sixth capacitor out of terminals of the third inductor;

a second output terminal of the smoothing unit that is connected to a terminal which is connected to the second output terminal of the second rectification unit out of the terminals of the sixth capacitor; and a seventh capacitor that is connected between the first and second output terminals of the smoothing unit, and wherein the second capacitor is connected between a transmission line, which connects the first rectifier element and the second rectifier element, and one of four terminals including both terminals of the sixth capacitor and both terminals of the seventh capacitor.

6. The switching power supply device according to claim 1, wherein the smoothing unit includes:

a fourth inductor that is connected to a second output terminal of the second rectification unit;

a sixth capacitor that is connected between a terminal which is not connected to the second output terminal of the second rectification unit out of terminals of the fourth inductor and a first output terminal of the second rectification unit;

a third inductor that is connected to a terminal which is connected to the first output terminal of the second rectification unit out of terminals of the sixth capacitor;

a first output terminal of the smoothing unit that is connected to a terminal which is not connected to the sixth capacitor out of terminals of the third inductor;

a second output terminal of the smoothing unit that is connected to a terminal which is connected to the fourth inductor out of the terminals of the sixth capacitor; and a seventh capacitor that is connected between the first and second output terminals of the smoothing unit, and wherein the second capacitor is connected between a transmission line, which connects the first rectifier element and the second rectifier element, and one of four terminals including both terminals of the sixth capacitor and both terminals of the seventh capacitor.

7. The switching power supply device according to claim 1, wherein the smoothing unit includes:

a fourth inductor that is connected to a first output terminal of the second rectification unit;

a sixth capacitor that is connected between a terminal which is not connected to the first output terminal of the second rectification unit out of terminals of the fourth inductor and a second output terminal of the second rectification unit;

a third inductor that is connected to a terminal which is connected to the second output terminal of the second rectification unit out of terminals of the sixth capacitor;

a first output terminal of the smoothing unit that is connected to a terminal which is connected to the fourth inductor out of terminals of the sixth capacitor;

a second output terminal of the smoothing unit that is connected to a terminal which is not connected to the sixth capacitor out of terminals of the third inductor; and a seventh capacitor that is connected between the first and second output terminals of the smoothing unit, and wherein the second capacitor is connected between a transmission line, which connects the first rectifier element and the second rectifier element, and one of four terminals including both terminals of the sixth capacitor and both terminals of the seventh capacitor.

8. The switching power supply device according to claim 1, wherein the smoothing unit includes:

a fourth inductor that is connected to a second output terminal of the second rectification unit;

a sixth capacitor that is connected between a terminal which is not connected to the second output terminal of the second rectification unit out of terminals of the fourth inductor and a first output terminal of the second rectification unit;

a third inductor that is connected to a terminal which is connected to the fourth inductor out of terminals of the sixth capacitor;

a first output terminal of the smoothing unit that is connected to a terminal which is connected to the first output terminal of the second rectification unit out of terminals of the sixth capacitor;

a second output terminal of the smoothing unit that is connected to a terminal which is not connected to the sixth capacitor out of the terminals of the third inductor; and a seventh capacitor that is connected between the first and second output terminals of the smoothing unit, and wherein the second capacitor is connected between a transmission line, which connects the first rectifier element and the second rectifier element, and one of four terminals including both terminals of the sixth capacitor and both terminals of the seventh capacitor.

9. The switching power supply device according to claim 1, wherein the smoothing unit includes:

an eighth capacitor that is connected between the first and second output terminals of the second rectification unit;

a fifth inductor that is connected to a terminal which is connected to a first output terminal of the second rectification unit out of terminals of the eighth capacitor;

a sixth inductor that is connected to a terminal which is connected to a second output terminal of the second rectification unit out of the terminals of the eighth capacitor;

a first output terminal of the smoothing unit that is connected to a terminal which is not connected to the eighth capacitor out of terminals of the fifth inductor;

a second output terminal of the smoothing unit that is connected to a terminal which is not connected to the eighth capacitor out of terminals of the sixth inductor; and a ninth capacitor that is connected between the first and second output terminals of the smoothing unit, and wherein the second capacitor is connected between a transmission line, which connects the first rectifier element and the second rectifier element, and one of four terminals including both terminals of the eighth capacitor and both terminals of the ninth capacitor.

10. The switching power supply device according to claim 1, wherein the first rectifier element and the second rectifier element are switching elements, and wherein the control unit performs switching control of the first switching element, the second switching element, and a switching element of the inverter and performs switching control of the first rectifier element and the second rectifier element.

11. The switching power supply device according to claim 2, wherein the first rectifier element and the second rectifier element are switching elements, and wherein the control unit performs switching control of the first switching element, the second switching element, and a switching element of the inverter and performs switching control of the first rectifier element and the second rectifier element.

12. The switching power supply device according to claim 3, wherein the first rectifier element and the second rectifier element are switching elements, and
wherein the control unit performs switching control of the first switching element, the second switching element, and a switching element of the inverter and performs switching control of the first rectifier element and the second rectifier element.

13. The switching power supply device according to claim 4, wherein the first rectifier element and the second rectifier element are switching elements, and
wherein the control unit performs switching control of the first switching element, the second switching element, and a switching element of the inverter and performs switching control of the first rectifier element and the second rectifier element.

14. The switching power supply device according to claim 5, wherein the first rectifier element and the second rectifier element are switching elements, and
wherein the control unit performs switching control of the first switching element, the second switching element, and a switching element of the inverter and performs switching control of the first rectifier element and the second rectifier element.

15. The switching power supply device according to claim 6, wherein the first rectifier element and the second rectifier element are switching elements, and
wherein the control unit performs switching control of the first switching element, the second switching element, and a switching element of the inverter and performs switching control of the first rectifier element and the second rectifier element.

16. The switching power supply device according to claim 7, wherein the first rectifier element and the second rectifier element are switching elements, and
wherein the control unit performs switching control of the first switching element, the second switching element, and a switching element of the inverter and performs switching control of the first rectifier element and the second rectifier element.

17. The switching power supply device according to claim 8, wherein the first rectifier element and the second rectifier element are switching elements, and
wherein the control unit performs switching control of the first switching element, the second switching element, and a switching element of the inverter and performs switching control of the first rectifier element and the second rectifier element.

18. The switching power supply device according to claim 9, wherein the first rectifier element and the second rectifier element are switching elements, and
wherein the control unit performs switching control of the first switching element, the second switching element, and a switching element of the inverter and performs switching control of the first rectifier element and the second rectifier element.

* * * * *